United States Patent Office
3,512,461
Patented May 19, 1970

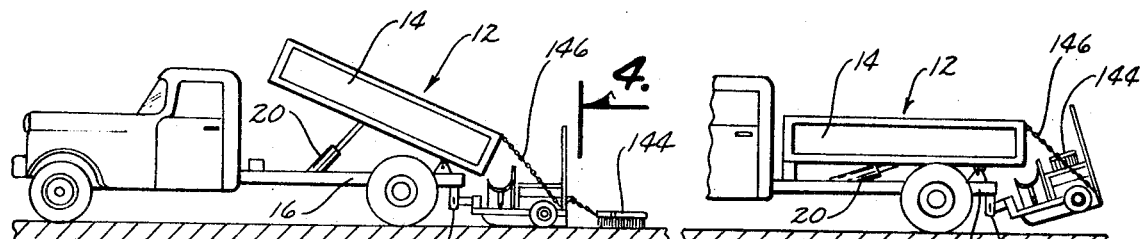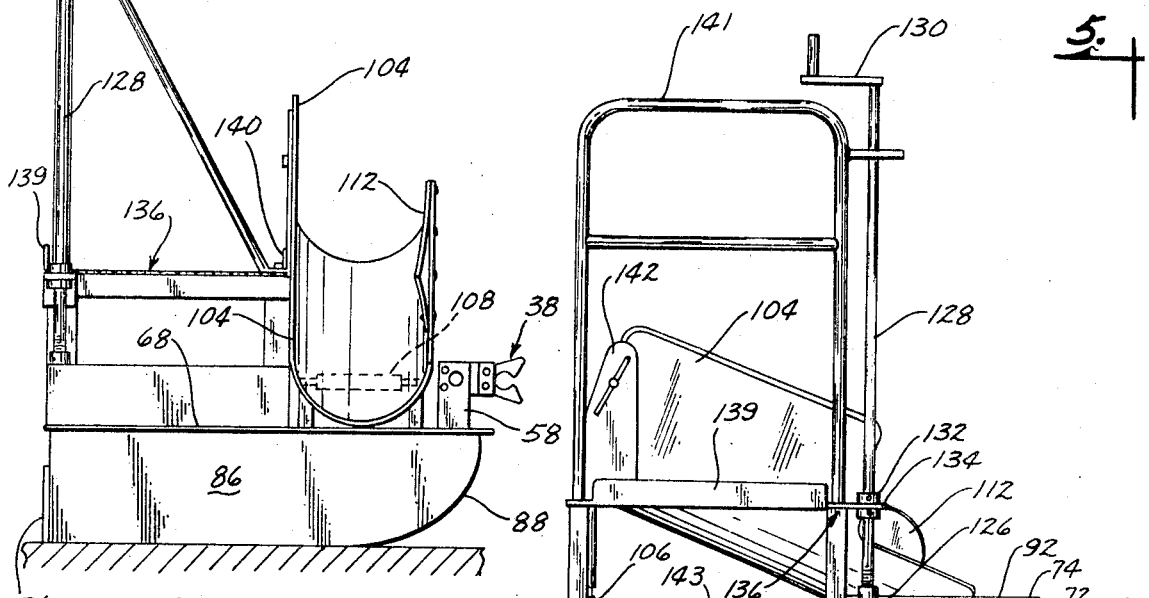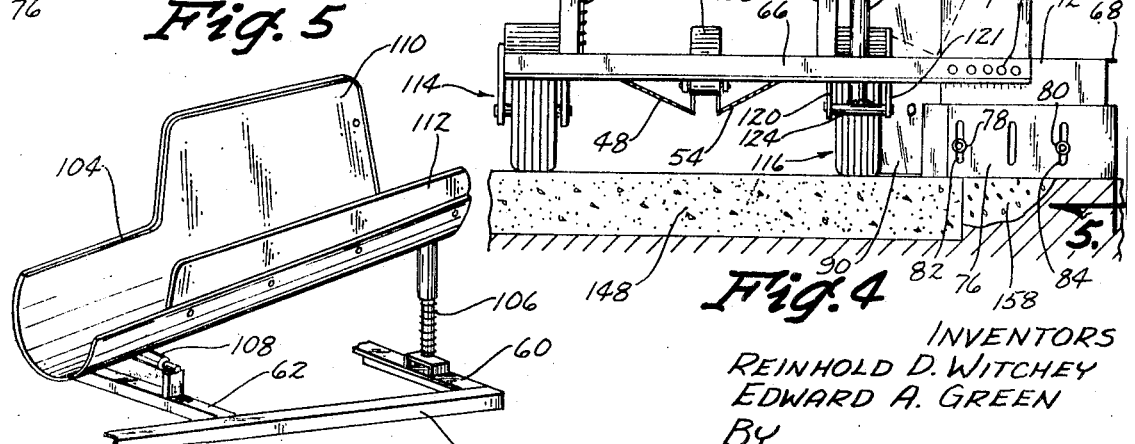
INVENTORS
REINHOLD D. WITCHEY
EDWARD A. GREEN
BY
Zarley, McKee & Thomte
ATTORNEYS

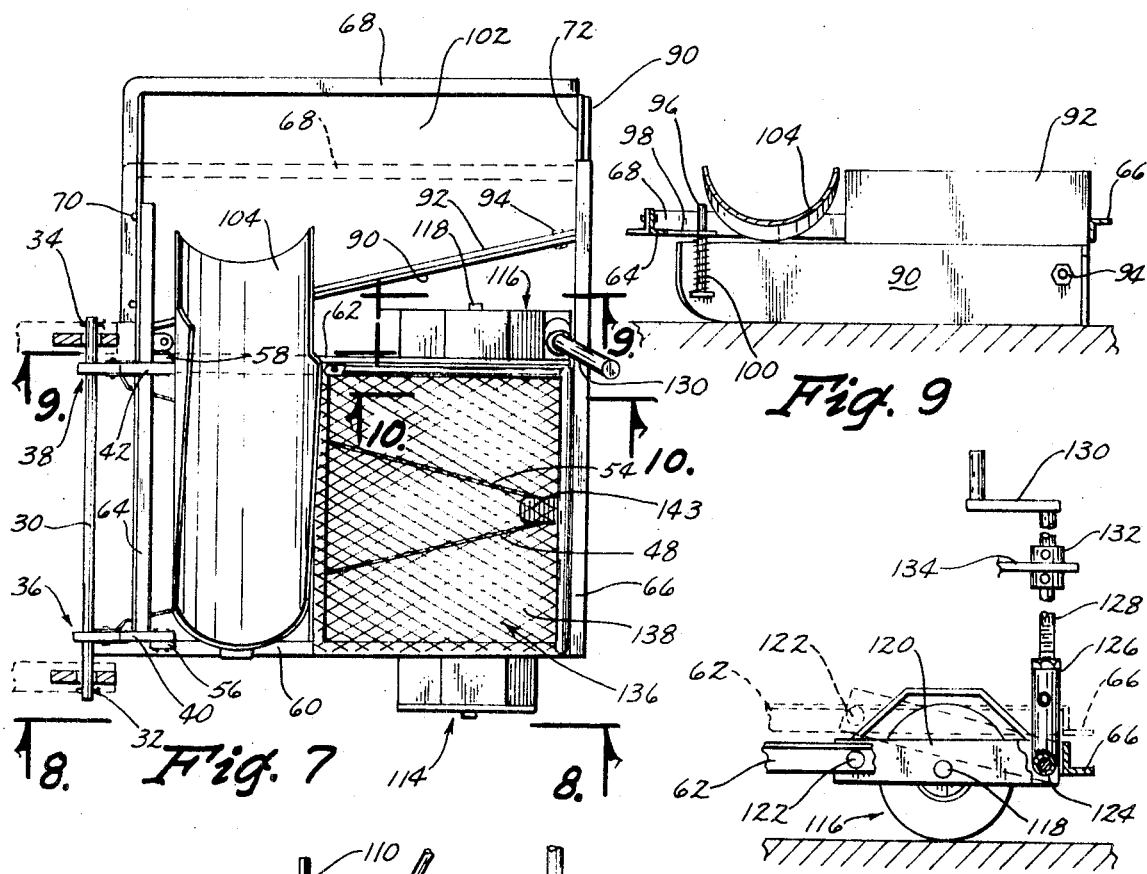
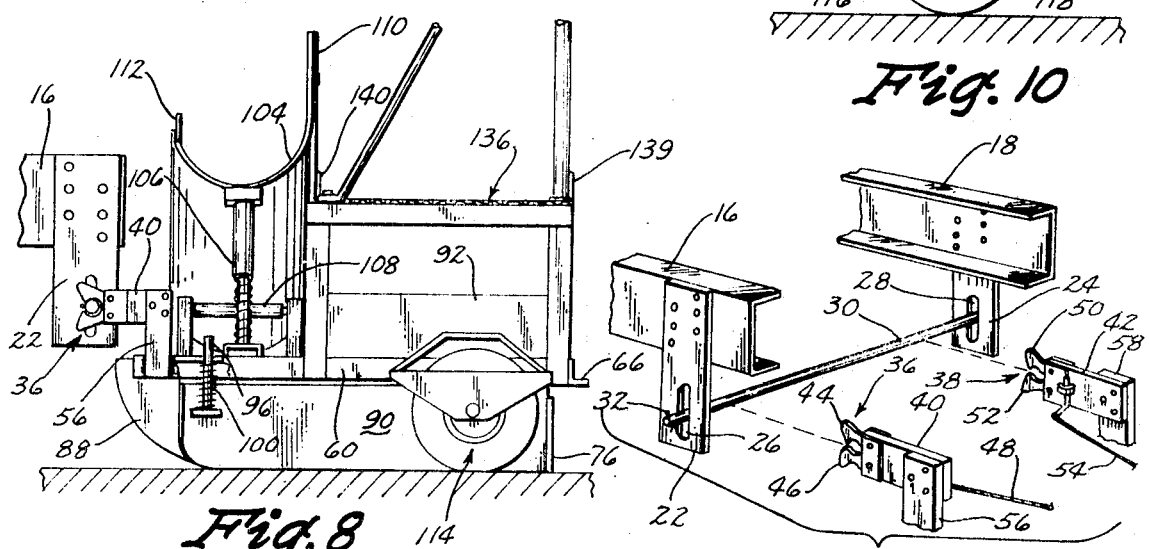

3,512,461
HIGHWAY SHOULDER CONDITIONING DEVICE
Reinhold D. Witchey, W. 4th Road, Rte. 1, and Edward A. Green, 251 Autumn Lane, both of Waterloo, Iowa 50701
Filed Jan. 19, 1968, Ser. No. 699,129
Int. Cl. E01c 19/12
U.S. Cl. 94—44                                              1 Claim

ABSTRACT OF THE DISCLOSURE

A highway shoulder conditioning device adapted to be detachably connected to the rearward end of a dump truck containing gravel or the like. The device includes a wheeled frame means having a chute means which is adapted to receive the gravel from the truck and to direct the same into an adjustable width hopper means which is positioned over the edge of the road and the rut formed adjacent thereto. A strike plate is secured to the rearward end of the hopper means which levels the gravel at a predetermined height as the dump truck pulls the device along the highway.

---

Ruts are commonly formed in the shoulders adjacent the pavement or asphalt of the highway. The ruts are caused by erosion from rain or thaw or by the vehicles driving off the edge of the paving. If the rut becomes deep, a serious safety hazard exists which must be eliminated by filling the same. The rut is normally filled with a compactible gravel or asphalt which will not easily erode and is usually filled every two to three years. Certain state highway departments use a wooden box having an opening at the lower rearward end thereof and which is towed behind a tractor. The gravel material is dumped into the wooden box and must necessarily be replenished from time to time. Other highway departments use a walking plow-type arrangement to distribute the gravel dumped along the side of the pavement. Both of the methods described above involve cumbersome equipment and require an excess of labor. Additionally, the two methods described above do not have any means for adjusting the width and depth of the fill.

Therefore, it is a principal object of this invention to provide a highway shoulder conditioning device.

A further object of this invention is to provide a highway shoulder conditioning device having means thereon for adjusting the width and depth of fill.

A further object of this invention is to provide a highway shoulder conditioning device which is quickly detachably connected to the rearward end of a dump truck or the like.

A further object of this invention is to provide a highway shoulder conditioning device having means thereon to prevent damage to the device upon contact with the box of the dump truck.

A further object of this invention is to provide a highway shoulder conditioning device which may be quickly moved from an operating position to a transport position.

A further object of this invention is to provide a highway shoulder conditioning device having means thereon to permit the operator to quickly raise or lower the level of the strike-off plate to compensate for various road conditions.

A further object of this invention is to provide a highway shoulder conditioning device having an automatic hitch means thereon for attachment to the dump truck.

A further object of this invention is to provide a highway shoulder conditioning device having a drag boom trailing therebehind to remove any remaining dirt or gravel from the pavement.

A further object of this invention is to provide a highway shoulder conditioning device which permits the filling of ruts formed in the shoulder at a relatively high rate of speed with a minimum amount of attendant labor.

A further object of this invention is to provide a highway shoulder conditioning device which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a side view of the device secured to the rearward end of the dump truck preparatory to being moved to a transport position;

FIG. 2 is a view similar to FIG. 1 except that the device has been raised to its transport position by the lowering of the box of the dump truck;

FIG. 3 is a fragmentary sectional view illustrating the ruts which are formed at either side of the highway;

FIG. 4 is a rear view of the device as seen along line 4—4 of FIG. 1;

FIG. 5 is a side view as seen along line 5—5 of FIG. 4;

FIG. 6 is a perspective view of the chute means;

FIG. 7 is a top view of the device;

FIG. 8 is a side view of the device as seen along lines 8—8 of FIG. 7;

FIG. 9 is a sectional view as seen along lines 9—9 in FIG. 7;

FIG. 10 is a sectional view as seen along lines 10—10 of FIG. 7 illustrating the pivotal movement of the frame means by the crank; and FIG. 11 is a perspective view of the automatic hitch means of the device and the rearward end of the dump truck.

The highway shoulder conditioning device is generally designated by the reference numeral 10 while the numeral 12 designates a dump truck having a box 14 pivotally mounted on a pair of longitudinal frame members 16 and 18. The box is raised and lowered by means of a hydraulic cylinder 20.

A pair of plates 22 and 24 are secured to frame members 16 and 18 respectively and extend downwardly therefrom as illustrated in FIG. 11. The plates 22 and 24 are provided with vertical slots 26 and 28 formed therein which is adapted to receive a rod 30 extending therethrough and therebetween. Rod 30 is maintained in slots 26 and 28 by cotter keys 32 and 34 extending through opposite ends thereof outwardly of plates 22 and 24. A pair of hitch assemblies 36 and 38 are mounted on the forward ends of plates 40 and 42 respectively as illustrated in FIG. 11. Hitch assembly 36 includes a pair of jaw members 44 and 46 which are spring loaded to maintain the same in a locked position but which may be opened by means of a cable 48 secured thereto. Likewise, hitch assembly 38 is provided with a pair of jaw members 50 and 52 which are controlled by a cable 54. The engagement of rod 30 with the forward ends of the hitch assemblies will cause the jaw members thereof to separate thereby causing the rod 30 to be received between the jaw members on each of the hitch assemblies 36 and 38 to automatically detachably secure the device 10 to the truck 12. The hitch assemblies 36 and 38 are detached from rod 30 by simply causing cables 48 and 54 to be pulled as will be explained later thereby opening the jaw members of the hitch assemblies. The lower rearward ends of plates 22 and 24 may be curved outwardly if desired to allow easy entrance of hitch assemblies 36 and 38.

A pair of arms 56 and 58 are secured to the rearward ends of plates 40 and 42 respectively and extend downwardly therefrom. A frame member 60 is secured to the lower end of arm 56 and extends rearwardly therefrom as illustrated FIGS. 7 and 8 while a frame member 62 is secured to the lower end of arm 58 and extends rearwardly therefrom parallel to frame member 60. Frame member 64 is secured to frame members 60 and 62 adjacent the forward end thereof and extends therebetween and outwardly of frame member 62 as illustrated in FIG. 7. Frame member 66 is secured to the rearward ends of frame members 60 and 62 and extends therebetween and outwardly thereof as also illustrated in FIG. 7. An L-shaped frame member 68 is secured to the outer end of frame member 64 by bolts 70 extending through openings formed therein. As illustrated in FIG. 7, frame member 68 may be moved towards and away from frame member 62 as illustrated by broken lines. A plate 72 is horizontally adjustably secured to the outer end of frame member 66 and the rearward end of frame member 68 by bolts 74. A strike plate 76 is vertically adjustably secured to the lower end of plate 72 by bolts 78 and 80 extending through plate 72 and the vertical slots 82 and 84 in strike plate 76 respectively. Wall member 86 is secured to the rearwardly extending portion of frame member 68 and is provided with a curved forward end 88 as illustrated in FIG. 5. A spring loaded blade 90 is pivotally secured to a sideboard 92 at 94 which extends between frame members 64 and 66 as illustrated in FIG. 9. Rod 96 is secured at its lower end to the forward end of blade 90 and is slidably received by a bracket 98 operatively secured to frame member 64. As seen in FIG. 9, a spring means 100 embraces rod 96 between bracket 98 and the point of connection of rod 96 with blade 90 to yieldably resist the upward pivotal movement of blade 90 with respect to the device. As seen in FIG. 4, side board 92 also extends around the rearward end of plate 72 so that the side board 92, blades 86 and 90, plate 72 and strike plate 76 form an adjustable width hopper which is generally designated by the reference numeral 102.

An inclined chute 104 is provided on the device and has its upper end mounted on a spring loaded support means 106 which is secured to frame member 60 and is designed to yieldably resist the downward movement of the upper end of chute 104. The lower end of chute 104 rests upon a roller means 108 so that the chute can roll on the roller means 108 when the upper end of a chute is lowered on its support means 106 such as will occur when the dump truck box 14 engages the same during the dumping operation. As seen in FIG. 6, chute 104 is provided with a raised back side portion 110 and a rubber front portion 112.

A wheel means 114 is rotatably mounted at the left side of the device as illustrated in FIGS. 4 and 8 while a wheel means 116 is provided at the right side of the device. Wheel means 116 includes an axle 118 which extends between the spaced apart frame members 120 and 121. The forward ends of frame members 120 and 121 are pivotally secured to frame member 62 by a pin 122 extending therethrough. The rearward ends of frame members 120 and 121 have a pin 124 secured thereto and extending therebetween as illustrated in FIG. 4. A collar 126 is secured to pin 124 and extends upwardly therefrom as seen in FIG. 10. Collar 126 threadably receives one end of a screw rod 128 which extends upwardly therefrom and which has a crank 130 provided at its upper end. Screw rod 128 threadably extends through a thrust collar means 132 which is secured to a bracket 134. Bracket 134 is secured to the operator's platform which is generally designated by the reference numeral 136. Operator's platform 136 includes a safety tread 138 provided thereon which is spaced upwardly from frame members 64 and 66 so that the operator is in a better position to control the gravel flowing from the dump truck into the chute. The operator's platform 136 is also provided with upwardly extending flanges 139 and 140 at the rearward and forward ends thereof to prevent the operator from slipping from the safety tread portion of the operator's platform. A guard rail means 141 is also provided at the rearward end of the device to prevent the operator from being thrown therefrom in the event that the truck should suddenly jerk forwardly. FIG. 4 illustrates the hitch release pedal 143 which is pivotally secured to frame member 66 and which has the cables 48 and 54 connected thereto. Hitch release pedal 143 is provided so that the hitch assemblies at the forward end of the device can be quickly released from the hitch rod 30. FIG. 4 also illustrates the fact that the upper end of chute 104 is movably secured to a support 142 to provide the proper stability to the chute. The numeral 144 generally designates a drag boom which may be detachably secured to the rearward end of the device to sweep the excess material from the pavement. A chain means 146 is also provided on the device which may be detachably connected to the upper rearward end of the box 14 and the frame means of the device as will be explained later. For purposes of description, the reference numeral 148 generally designates a paved road having ruts 150 and 152 formd alongside thereof in the shoulders 154 and 156 respectively. The gravel material which is deposited in the rut will be generally designated by the reference numeral 158.

In operation, the device is secured to the rearward end of the dump truck 12 by means of attaching hitch assemblies 36 and 38 to the hitch rod 30 as previously described. It can be appreciated that hitch rod 30 can float in the slots 26 and 28 to permit the compensation for variation in road surfaces. The box 14 of the dump truck 12 would contain gravel or the like and the same would be elevated by the cylinder means 20 so that gravel will flow from the rearward end thereof into the chute means 104. The gravel flows down from the chute 104 into the hopper means 102 as the truck 12 pulls the device 10 along the road as illustrated in FIG. 4. As the device is being pulled along the road, the angled blade 90 will ride upon the road surface and will remove excess gravel from the paving and will scrape the same into the rut adjacent thereto. The strike plate 76 is adjustable with respect to plates 72 to control the depth of fill 158 in the ruts 150 and 152. It can be appreciated that the movement of the device along the road will cause the rut 150 to be filled with the gravel material 158 at the proper level since the hopper means 102 will be filled with gravel and with the strike plate 76 controlling the depth of fill therein. The adjustable width hopper means 102 insures that the device can be properly adjusted to correspond to the rut that is being filled to also comply with any highway commission regulations.

As previously stated, the chute 104 is spring loaded on its upper end and rotatably supported on the roller means 108 at its lower end to prevent damage to the chute when the box of the dump truck contacts the same. The front portion of the chute is provided with the rubber front portion 112 to prevent spillage of the gravel from the chute but yet to permit the raising of the box or the unit without damage to the chute. The raised rearward portion on the gravel chute 104 prevents spillage of the gravel as the same is dumped from the dump box. The height of the operator's platform is such that the operator can easily reach into the dump box with a shovel to insure a steady flow of gravel therefrom onto the chute 104. The open safety tread 138 on the operator's platform insures that the operator will have sufficient footing and also permits any gravel spillage to pass therethrough.

The wheel means 116 by being pivoted about a pin ahead of the wheel and with the screw adjustment rearwardly thereof makes it possible for the operator to raise or lower the level of the strike-off plate 76 at any time for any road condition by simply rotating the crank 130 which causes the frame member 62 to be raised or lowered with respect to the axle 118 as illustrated in FIG 10. The hitch assemblies 36 and 38 permit the device to be automatically connected to the truck as previously described and the device may be easily detached from the truck by simply depressing hitch release pedal 143 which will open the jaw members of the hitch assemblies so that the truck can be driven forwardly with respect to the device which will cause hitch rod 30 to move out of engagement with the hitch assemblies 36 and 38. The device is easily transported from one location to another by simply elevating the box 14 of the dump truck 12 and by connecting the chain means 146 to the upper corners of the box 14. The operator then lowers the box 14 from the position of FIG. 1 to the position of FIG. 2 which causes the device 10 to be pivoted about hitch rod 30 thereby lifting the rearward end of the device from the ground. Thus, when the device has been pivoted to the position of FIG. 2, the truck may travel at a relatively high rate of speed to transport the device to the new location.

Thus it can be seen that a highway shoulder conditioning device has been provided which has means thereon for adjusting the width and the depth of the fill. It can also be seen that a device has been described which permits the filling of ruts formed in the shoulder at a relatively high rate of speed with a minimum amount of attendant labor. Thus it can be seen that the device accomplishes at least all of its stated objectives.

Some changes may be made in the construction and arrangement of our highway shoulder conditioning device without departing from the real spirit and purpose of our invention, and it is our intention to cover by our claims, any modified forms of structure or use of mechanical equivalents which may be reasonably included within our scope.

We claim:
1. In a highway shoulder conditioning device,
   a frame means having rearward and forward ends and adapted to be detachably secured to a prime mover,
   a hopper means on said frame means adapted to pass over a portion of the highway pavement and the shoulder adjacent thereto,
   a chute means on said frame means adapted to receive material from the prime mover and to direct the same into said hopper means,
   said hopper means having an opening formed in its lower rearward end, said opening being adjustably closed by a strike-off plate means,
   said chute means having upper and lower ends, the upper end of said chute means being normally biased upwardly by a spring means, the lower end of said chute means being movably mounted on a roller means.

References Cited

UNITED STATES PATENTS

| | | | |
|---|---|---|---|
| 2,116,503 | 5/1938 | Arndt | 94—44 |
| 2,116,504 | 5/1938 | Arndt | 94—44 |
| 2,176,534 | 10/1939 | Loos | 94—44 |
| 2,197,878 | 4/1940 | Robinson | 94—44 |
| 2,403,820 | 9/1946 | Miller | 94—44 |
| 2,413,632 | 12/1946 | Jackson | 94—44 |
| 2,848,930 | 8/1958 | Thompson | 94—44 |
| 3,015,261 | 2/1962 | McDonald | 94—44 XR |
| 3,029,714 | 4/1962 | Creswell | 94—44 |
| 3,109,352 | 11/1963 | Mack | 94—44 XR |
| 3,131,616 | 5/1964 | Gostovich | 94—46 |
| 2,252,691 | 8/1941 | Arndt | 280—460 |
| 2,309,086 | 1/1943 | Arndt | 280—460 |
| 2,522,610 | 9/1950 | Gordon | 94—44 |
| 2,021,767 | 11/1935 | Church | 94—45 |

JACOB L. NACKENOFF, Primary Examiner